United States Patent
Wang

(10) Patent No.: US 9,800,715 B2
(45) Date of Patent: Oct. 24, 2017

(54) METHODS AND SYSTEMS FOR DETECTION MANAGEMENT BETWEEN ELECTRONIC DEVICES

(71) Applicant: Noodoe Corporation, Taipei (TW)

(72) Inventor: John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 0 days.

(21) Appl. No.: 15/206,519

(22) Filed: Jul. 11, 2016

(65) Prior Publication Data

US 2017/0026508 A1  Jan. 26, 2017

(30) Foreign Application Priority Data

Jul. 21, 2015 (TW) .............................. 104123486 A

(51) Int. Cl.
| | | |
|---|---|---|
| *H04M 3/42* | (2006.01) | |
| *H04M 1/725* | (2006.01) | |
| *H04W 4/00* | (2009.01) | |
| *H04W 68/00* | (2009.01) | |

(52) U.S. Cl.
CPC ....... *H04M 1/72569* (2013.01); *H04W 4/008* (2013.01); *H04W 68/00* (2013.01); *H04M 1/7253* (2013.01)

(58) Field of Classification Search
CPC . H04W 4/008; H04W 68/00; H04M 1/72569; H04M 1/7253
USPC ...................................................... 455/414.1
See application file for complete search history.

(56) References Cited

U.S. PATENT DOCUMENTS

| | | | | |
|---|---|---|---|---|
| 2005/0075116 A1* | 4/2005 | Laird | ....................... | A61B 5/04 455/456.3 |
| 2006/0261939 A1* | 11/2006 | Blakeway | ........... | G07C 9/00111 340/539.1 |
| 2011/0312350 A1* | 12/2011 | Agerholm | ............ | G08B 13/196 455/466 |
| 2012/0299721 A1* | 11/2012 | Jones | ..................... | B60R 25/33 340/521 |
| 2013/0151200 A1 | 6/2013 | Hui et al. | | |
| 2014/0046596 A1 | 2/2014 | Chang et al. | | |
| 2014/0073262 A1* | 3/2014 | Gutierrez | ............ | H04M 1/7253 455/67.11 |

FOREIGN PATENT DOCUMENTS

| | | |
|---|---|---|
| CN | 103154762 A | 6/2013 |
| CN | 103565648 A | 2/2014 |

* cited by examiner

*Primary Examiner* — William Nealon
(74) *Attorney, Agent, or Firm* — McClure, Qualey & Rodack, LLP

(57) ABSTRACT

Methods and systems for detection management between electronic devices are provided. First, a specific signal is received from a specific electronic device via a wireless network, wherein the specific signal includes identification data and a battery status corresponding to the specific electronic device. When the specific signal is not continuously received from the specific electronic device via the wireless network, it is determined whether the recorded battery status is greater than a predefined threshold value. When the recorded battery status is greater than the predefined threshold value, a warning message is generated. In some embodiments, the motion information of the specific electronic device can be used to determine whether to generate the warning message.

7 Claims, 11 Drawing Sheets

METHODS AND SYSTEMS FOR DETECTION MANAGEMENT BETWEEN ELECTRONIC DEVICES

BACKGROUND OF THE INVENTION

Field of the Invention

The disclosure relates generally to detection management methods and systems, and, more particularly to methods and systems that can manage the detection situation between electronic devices, and timely generate warning notifications according to the detection situation.

Description of the Related Art

Recently, electronic devices, such as smart phones, tablets, notebooks, and other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

Furthermore, with the coming of IOT (Internet Of Things) generation, every device or object can connect to networks, and users can access and control these devices or objects via networks. The rapid development of IOT is fortunate that the underlying foundation of wireless network technology is already very mature. Electronic devices can readily connect with each other to perform related applications via wireless networks. Additionally, the BLE (Bluetooth Low Energy) technology has solved the prohibitive power consumption issue caused by prolonged connections of electronic devices to wireless networks. For example, a beacon device is a low-cost wireless Bluetooth transmitter implemented with BLE technology, which can transmit Bluetooth signals via a wireless network for a long time. A mobile phone implemented with BLE technology can wirelessly seek Bluetooth signals to discover corresponding beacon device.

Currently, a large amount of innovative applications are developed using beacon devices. Since these devices usually have a small and exquisite design, a common issue is these devices may be lost or moved to non-preset places by users. Once these devices are not at the preset places, these applications may be malfunction or lost their expected effects. Related cost and the reset complexity of the whole service will be increased if these devices are lost.

BRIEF SUMMARY OF THE INVENTION

Methods and systems for detection management between electronic devices are provided, wherein the detection situation between electronic devices are managed, and warning notifications are timely generated according to the detection situation.

In an embodiment of a method for detection management between electronic devices, a specific signal is received from a specific electronic device via a wireless network, wherein the specific signal comprises identification data and a battery status corresponding to the specific electronic device. The identification data and the battery status corresponding to the specific electronic device are recorded. It is determined whether the specific signal is continuously received from the specific electronic device via the wireless network. When the specific signal is not continuously received from the specific electronic device via the wireless network, it is determined whether the recorded battery status is greater than a predefined threshold value. When the recorded battery status is greater than the predefined threshold value, a warning message is generated.

An embodiment of a system for detection management between electronic devices comprises a wireless connecting unit and a processing unit. The wireless connecting unit receives a specific signal from a specific electronic device via a wireless network, wherein the specific signal comprises identification data and a battery status corresponding to the specific electronic device. The processing unit records the identification data and the battery status corresponding to the specific electronic device. The processing unit determines whether the specific signal is continuously received from the specific electronic device via the wireless network. When the specific signal is not continuously received from the specific electronic device via the wireless network, the processing unit determines whether the recorded battery status is greater than a predefined threshold value. When the recorded battery status is greater than the predefined threshold value, the processing unit generates a warning message.

In some embodiments, the specific electronic device broadcasts the specific signal in a predefined frequency, wherein the specific signal comprises the identification data corresponding to the specific electronic device, and the newest battery status corresponding to the specific electronic device.

In some embodiments, it is determined whether a signal strength of the specific signal corresponding to the specific electronic device is greater than a predefined value. When the signal strength of the specific signal corresponding to the specific electronic device is not greater than the predefined value, it is determined that the specific signal is not received. In some embodiments, when the specific signal is not received, and the battery status corresponding to the specific electronic device is greater than the predefined threshold value, a warning message is generated via the specific electronic device.

In some embodiments, motion information is received from the specific electronic device via the wireless network, wherein the specific electronic device comprises at least one sensor for detecting a motion and/or posture corresponding to the specific electronic device, and accordingly generating the motion information. When the specific signal is received from the specific electronic device, it is determined whether the posture corresponding to the specific electronic device conforms or substantially conforms to at least one predefined posture within a predefined period according to the motion information. When the posture corresponding to the specific electronic device does not conform or substantially conform to the at least one predefined posture within the predefined period, the warning message is generated.

In some embodiments, motion information is received from the specific electronic device via the wireless network, wherein the specific electronic device comprises at least one sensor for detecting a motion and/or posture corresponding to the specific electronic device, and accordingly generating the motion information. When the specific signal is received from the specific electronic device, it is determined whether the specific electronic device continuously moves in a predefined period according to the motion information. When the specific electronic device continuously moves in the predefined period, the warning message is generated.

In an embodiment of a method for detection management between electronic devices, a specific signal is received from a specific electronic device via a wireless network, wherein the specific signal comprises identification data and motion information corresponding to the specific electronic device. The specific electronic device comprises at least one sensor for detecting a motion and/or posture corresponding to the specific electronic device, and accordingly generating the motion information. It is determined whether the posture corresponding to the specific electronic device conforms or substantially conforms to at least one predefined posture within a predefined period according to the motion information. When the posture corresponding to the specific electronic device does not conform or substantially conform to the at least one predefined posture within the predefined period, a warning message is generated.

In an embodiment of a method for detection management between electronic devices, a specific signal is received from a specific electronic device via a wireless network, wherein the specific signal comprises identification data and motion information corresponding to the specific electronic device. The specific electronic device comprises at least one sensor for detecting a motion and/or posture corresponding to the specific electronic device, and accordingly generating the motion information. It is determined whether the specific electronic device continuously moves in a predefined period according to the motion information. When the specific electronic device continuously moves in the predefined period, a warning message is generated.

Methods for detection management between electronic devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for detection management between electronic devices are provided.

Figure 1:
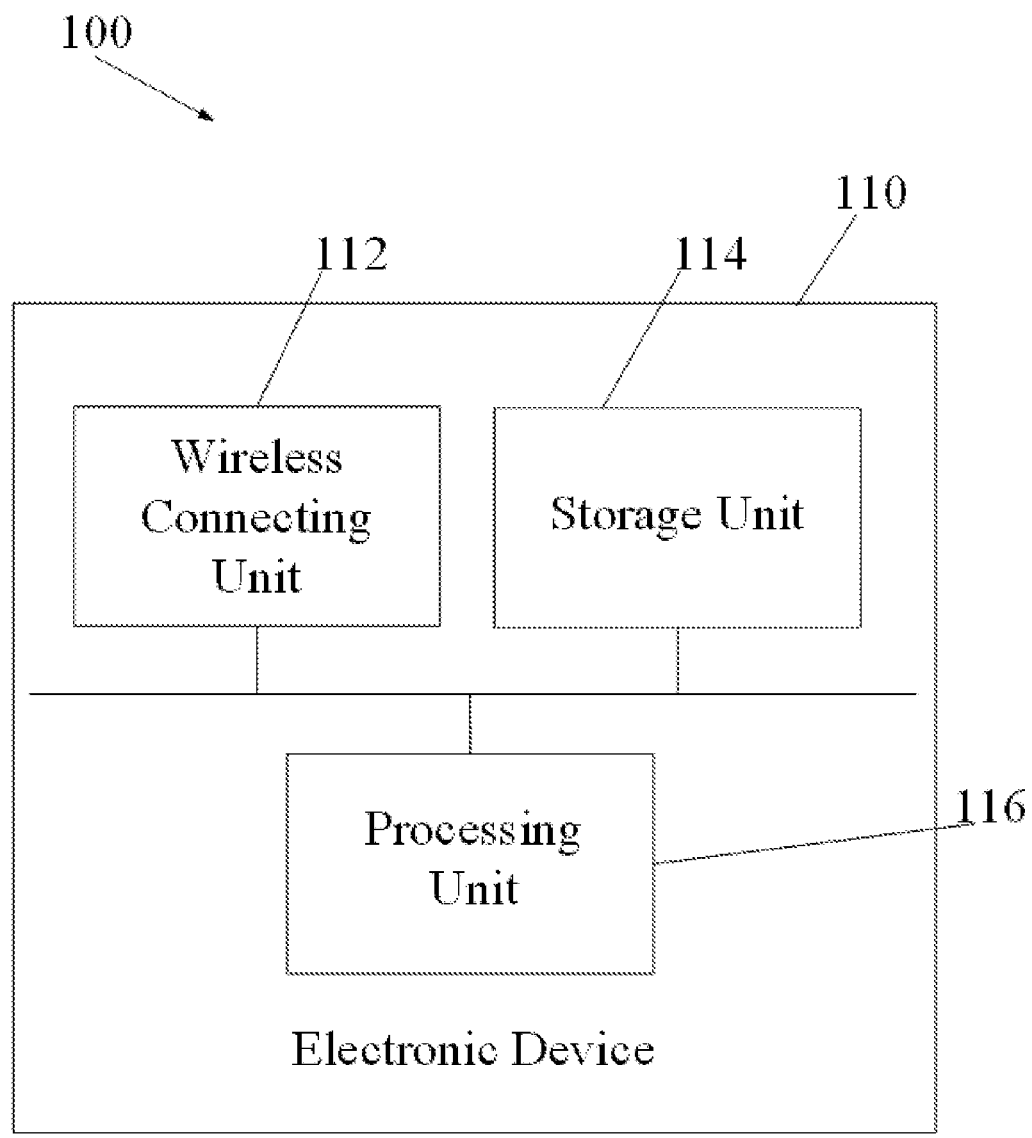
FIG. 1 is a schematic diagram illustrating an embodiment of a system for detection management between electronic devices of the invention.

FIG. 1 is a schematic diagram illustrating an embodiment of a system for detection management between electronic devices of the invention. The system for detection management between electronic devices 100 can be used in an electronic device 110, such as a computer, or a portable device, such as a mobile phone, a smart phone, a PDA (Personal Digital Assistant), a GPS (Global Positioning System), a tablet computer, or other portable device. As shown in FIG. 1, the electronic device 110 comprises a wireless connecting unit 112, a storage unit 114, and a processing unit 116. The wireless connecting unit 112 can receive data transmitted from other electronic devices via a wireless network, such as Wi-Fi or Bluetooth network, or connect to other electronic devices having wireless connecting capabilities. The storage unit 114 can store related data. The processing unit 116 can control related operations of hardware and software in the electronic device 110, and perform the methods for detection management between electronic devices of the invention, which will be discussed further in the following paragraphs. It is understood that, in some embodiments, the electronic device 110 can further comprise a display unit (not shown in FIG. 1) for displaying related information, such as texts, images, and/or interfaces. In some embodiments, the electronic device 110 can further comprise a sound output unit (not shown in FIG. 1) for generating a sound. In some embodiments, the electronic device 110 can further comprise a vibration unit (not shown in FIG. 1) for generating a vibration.

It is understood that, in some embodiments, the wireless connecting unit 112 may be a wireless connecting unit implemented with a low-power consumption technology, such as Bluetooth Smart technology. The Bluetooth Smart technology supports two modes: central and peripheral. In the central mode, the wireless connecting unit can receive data from the wireless connecting units of other electronic devices, and can actively connect to other electronic devices. In the peripheral mode, the wireless connecting unit can broadcast signals, such as its identification data. However, the wireless connecting unit cannot actively connect to other electronic devices in the peripheral mode. In some embodiments, the wireless connecting unit 112 is in the central mode.

Figure 2:
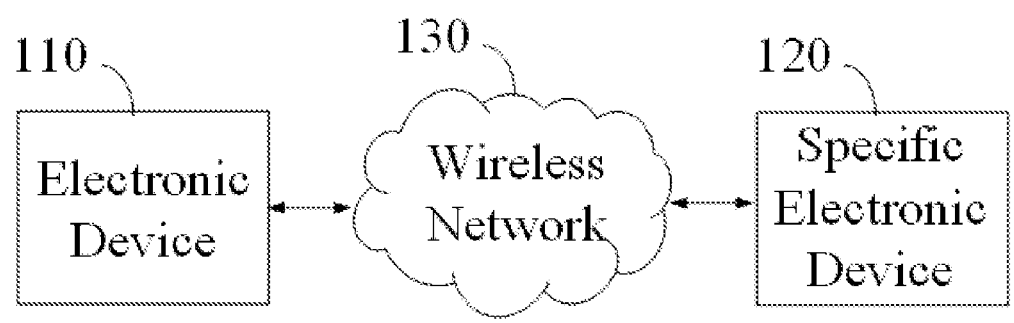
FIG. 2 is a schematic diagram illustrating another embodiment of a system for detection management between electronic devices of the invention.

FIG. 2 is a schematic diagram illustrating another embodiment of a system for detection management between electronic devices of the invention. The system for detection management between electronic devices comprises an electronic device 110 and a specific electronic device 120. In some embodiments, the electronic device 110 may be a computer, or a portable device, such as a mobile phone, a smart phone, a PDA, a GPS, a tablet computer, or other portable device. In some embodiments, the electronic device 110 can receive data transmitted by the specific electronic device 120 via a wireless network 130, such as Wi-Fi or Bluetooth network.

Figure 3:
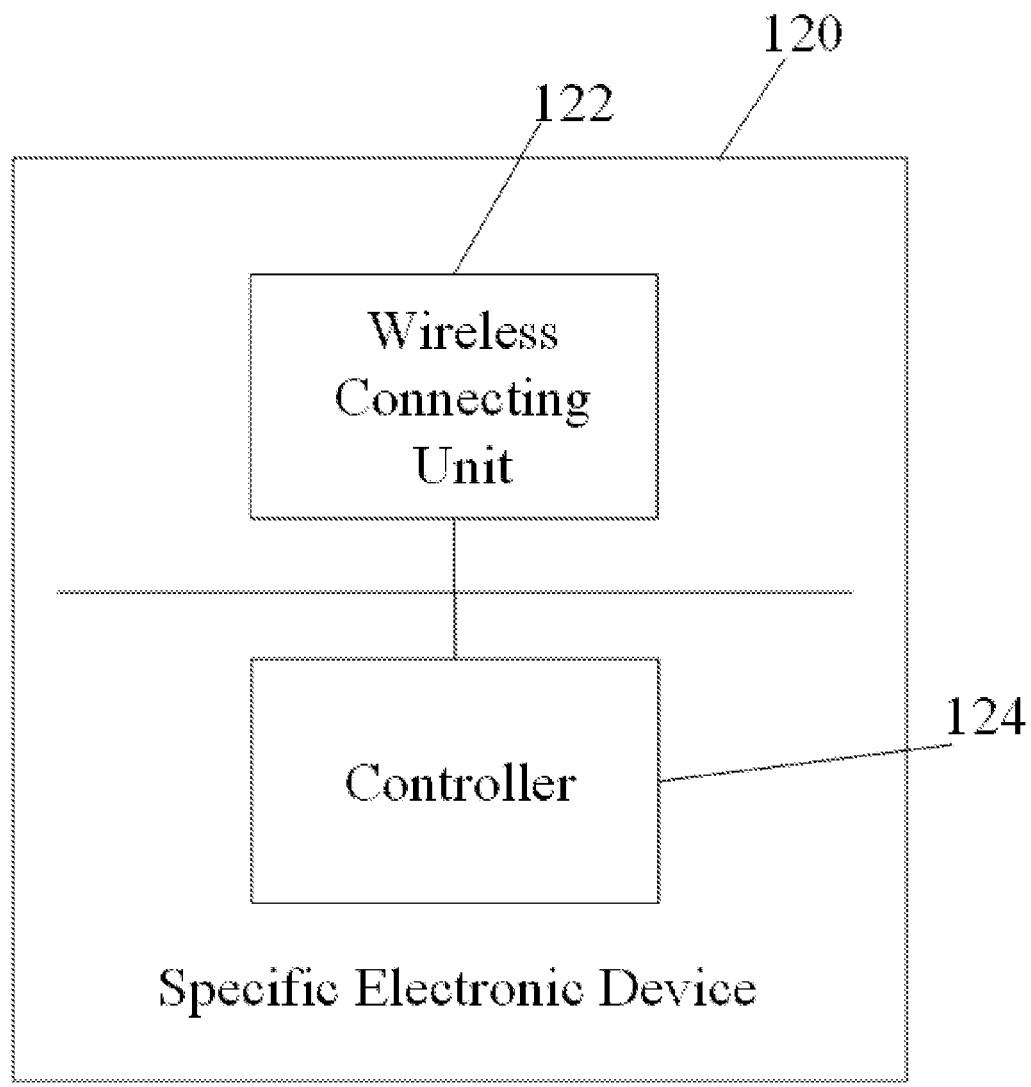
FIG. 3 is a schematic diagram illustrating an embodiment of a specific electronic device of the invention.

FIG. 3 is a schematic diagram illustrating an embodiment of a specific electronic device of the invention. As shown in FIG. 3, the specific electronic device 120 comprises a wireless connecting unit 122 and a controller 124. The wireless connecting unit 122 can transmit data via a wireless network, such as Wi-Fi or Bluetooth network, and/or connect to other electronic devices, such as the electronic device 110 having wireless connecting capabilities. The controller 124 can control related operations of hardware and software in the specific electronic device 120. It is understood that, in some embodiments, the wireless connecting unit 122 may be a wireless connecting unit implemented with a low-power consumption technology, such as Bluetooth Smart technology. As described, the Bluetooth Smart technology supports two modes: central and peripheral. In the central mode, the wireless connecting unit can receive data from the wireless connecting units of other electronic devices, and can actively connect to other electronic devices. In the peripheral mode, the wireless connecting unit can broadcast signals, such as its identification data. However, the wireless connecting unit cannot actively connect to other electronic devices in the peripheral mode. In some embodiments, the wireless connecting unit 122 is in the peripheral mode. In other words, the network connecting unit 122 has data broadcasting capabilities, and the network connecting unit 122 cannot actively connect to other electronic devices, wherein the network connecting unit 122 can be passively connected to other electronic devices.

Figure 4:
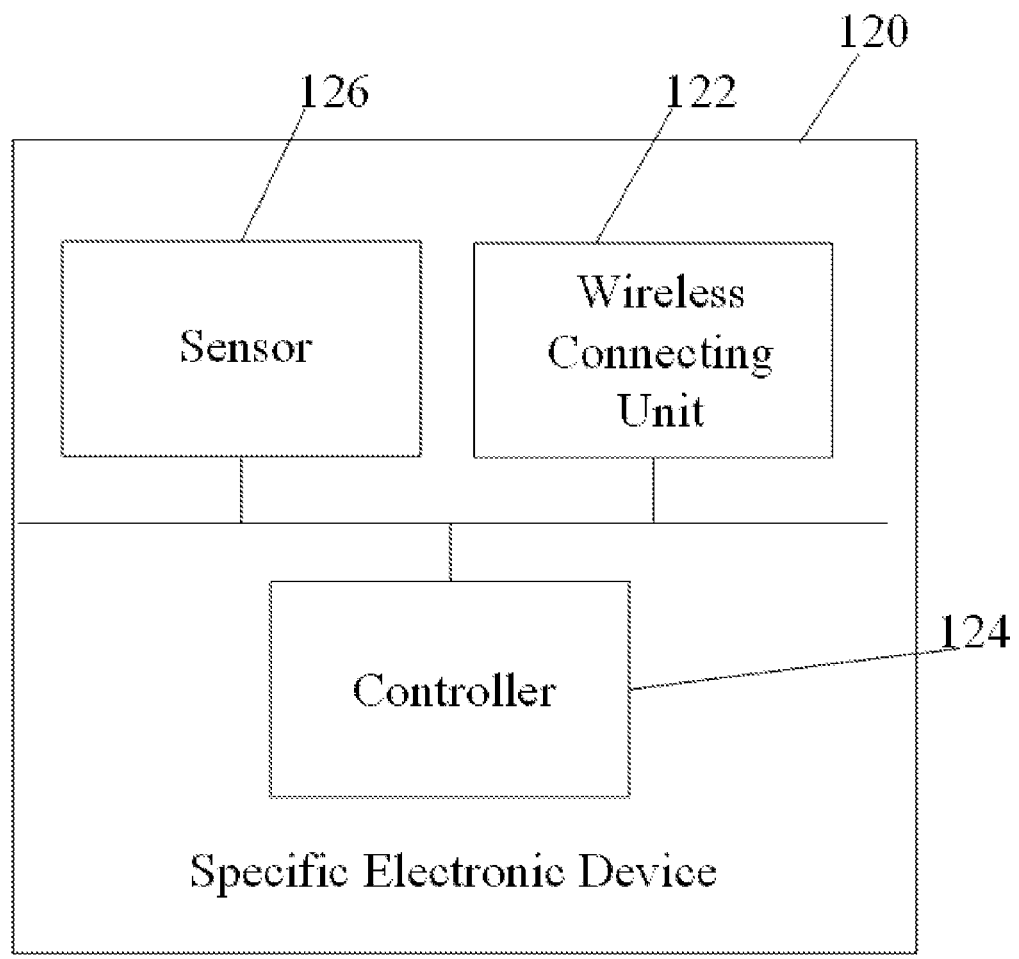
FIG. 4 is a schematic diagram illustrating another embodiment of a specific electronic device of the invention.

FIG. 4 is a schematic diagram illustrating another embodiment of a specific electronic device of the invention. As shown in FIG. 4, the specific electronic device 120 comprises at least one sensor 126, a wireless connecting unit 122 and a controller 124. The at least one sensor 126 can detect a motion and/or posture corresponding to the specific electronic device 120, and accordingly generating motion information. It is understood that, in some embodiments, the sensor 126 may be an accelerometer for generating information of velocity and displacement when the device moves. In some embodiments, the sensor 126 may be a Gyro sensor for generating information of angular acceleration when the device moves. It is noted that, the above sensors are only examples of the present application, and the present invention is not limited thereto. Any sensor that can detect the motion and/or posture of an electronic device can be applied in the present invention. The wireless connecting unit 122 can transmit data via a wireless network, such as Wi-Fi or Bluetooth network, and/or connect to other electronic devices, such as the electronic device 110 having wireless connecting capabilities. The controller 124 can control related operations of hardware and software in the specific electronic device 120. Similarly, in some embodiments, the wireless connecting unit 122 may be a wireless connecting unit implemented with a low-power consumption technology, such as Bluetooth Smart technology. As described, the Bluetooth Smart technology supports two modes: central and peripheral. In the central mode, the wireless connecting unit can receive data from the wireless connecting units of other electronic devices, and can actively connect to other electronic devices. In the peripheral mode, the wireless connecting unit can broadcast signals, such as its identification data. However, the wireless connecting unit cannot actively connect to other electronic devices in the peripheral mode. In some embodiments, the wireless connecting unit 122 is in the peripheral mode. In other words, the network connecting unit 122 has data broadcasting capabilities, and the network connecting unit 122 cannot actively connect to other electronic devices, wherein the network connecting unit 122 can be passively connected to other electronic devices.

Figure 5:
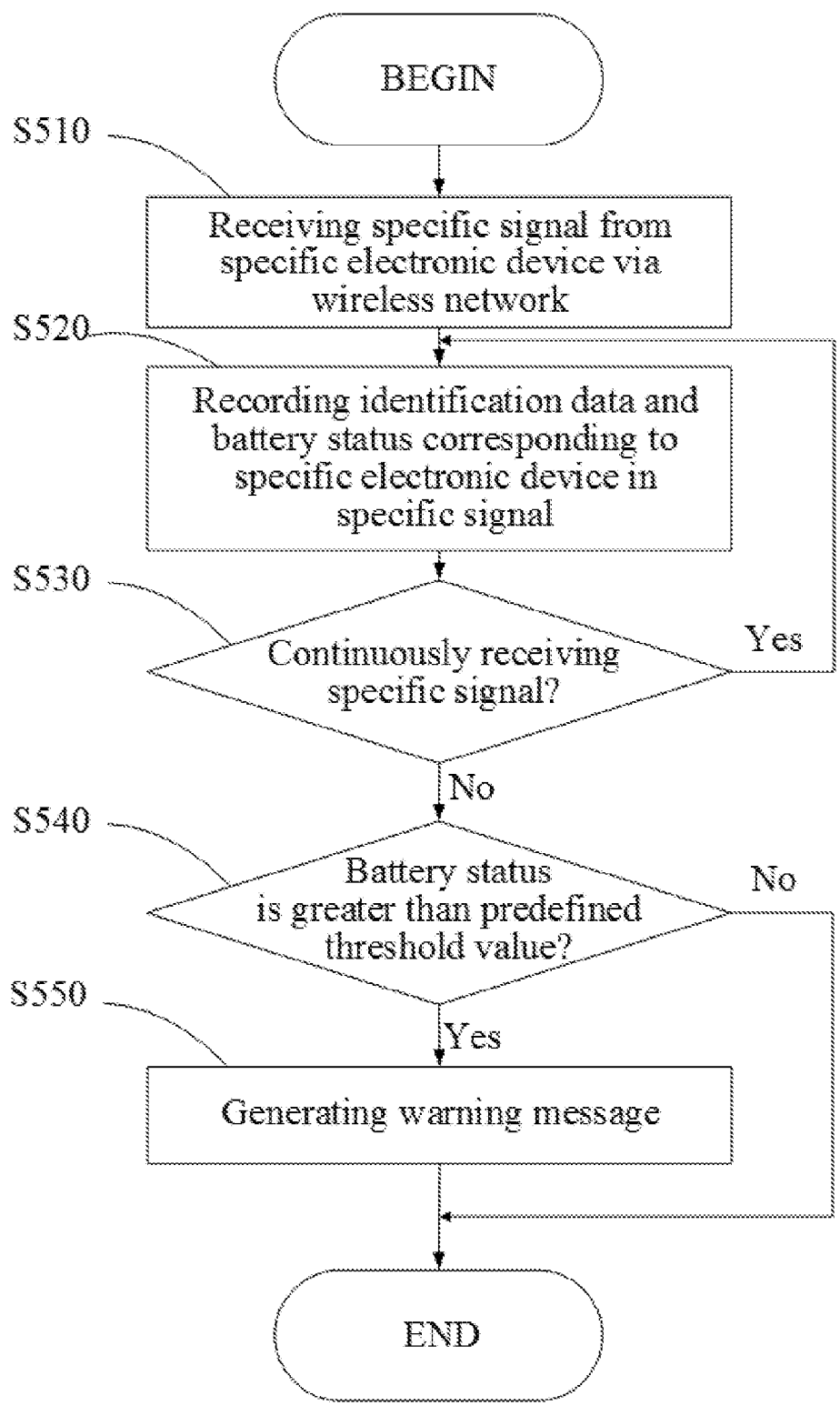
FIG. 5 is a flowchart of an embodiment of a method for detection management between electronic devices of the invention.

FIG. 5 is a flowchart of an embodiment of a method for detection management between electronic devices of the invention. The method for detection management between electronic devices can be used in an electronic device, such as a computer, or a portable device, such as a mobile phone, a smart phone, a PDA, a GPS, a tablet computer, or other portable device.

In step S510, a specific signal is received from a specific electronic device via a wireless network, such as Wi-Fi or Bluetooth network. The specific signal comprises identification data and a battery status corresponding to the specific electronic device. It is understood that, in some embodiments, the specific electronic device can periodically obtain the newest battery status of the specific electronic device, and broadcast the specific signal with the identification data and the newest battery status corresponding to the specific electronic device in a predefined frequency. In step S520, the identification data and the battery status corresponding to the specific electronic device in the specific signal are recorded. In step S530, it is determined whether the specific signal is continuously received from the specific electronic device via the wireless network. When the specific signal is continuously received from the specific electronic device via the wireless network (Yes in step S530), the procedure returns to step S520. When the specific signal is not continuously received from the specific electronic device via the wireless network (No in step S530), in step S540, it is determined whether the recorded battery status is greater than a predefined threshold value. When the recorded battery status is not greater than the predefined threshold value (No in step S540), the procedure is completed. When the recorded battery status is greater than the predefined threshold value (Yes in step S540), in step S550, a warning message is generated, wherein the warning message indicates that the specific electronic device may be removed from the original preset place, or the specific electronic device may be lost.

Figure 6:
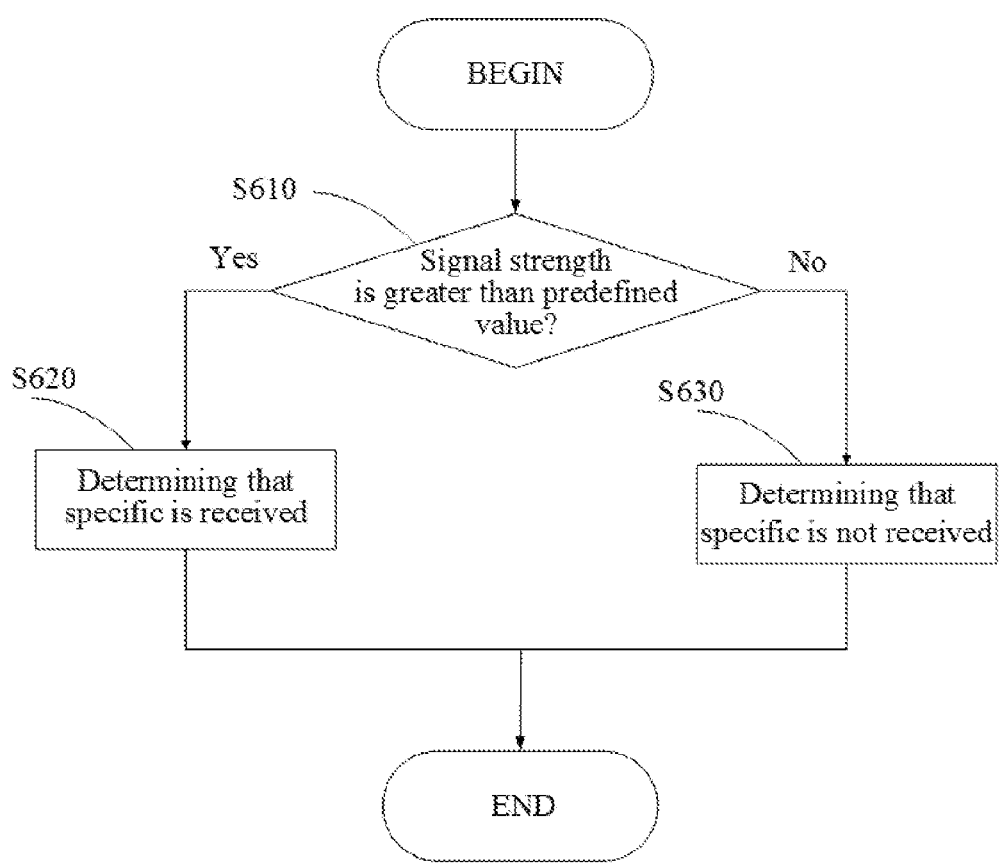
FIG. 6 is a flowchart of an embodiment of a method for determining whether a specific signal is received of the invention.

FIG. 6 is a flowchart of an embodiment of a method for determining whether a specific signal is received of the invention. In step S610, it is determined whether a signal strength of the specific signal corresponding to the specific electronic device is greater than a predefined value according to the received specific signal. When the signal strength of the specific signal corresponding to the specific electronic device is greater than the predefined value (Yes in step S610), in step S620, it is determined that the specific signal corresponding to the specific electronic device is received via the wireless network. When the signal strength of the specific signal corresponding to the specific electronic device is not greater than the predefined value (No in step S610), in step S630, it is determined that the specific signal corresponding to the specific electronic device is not received via the wireless network. In other words, when the signal strength of the specific signal is lower than the predefined value, it is determined that the specific signal is not received. At this time, the electronic device still can connect to the specific electronic device via a wireless network.

Figure 7:
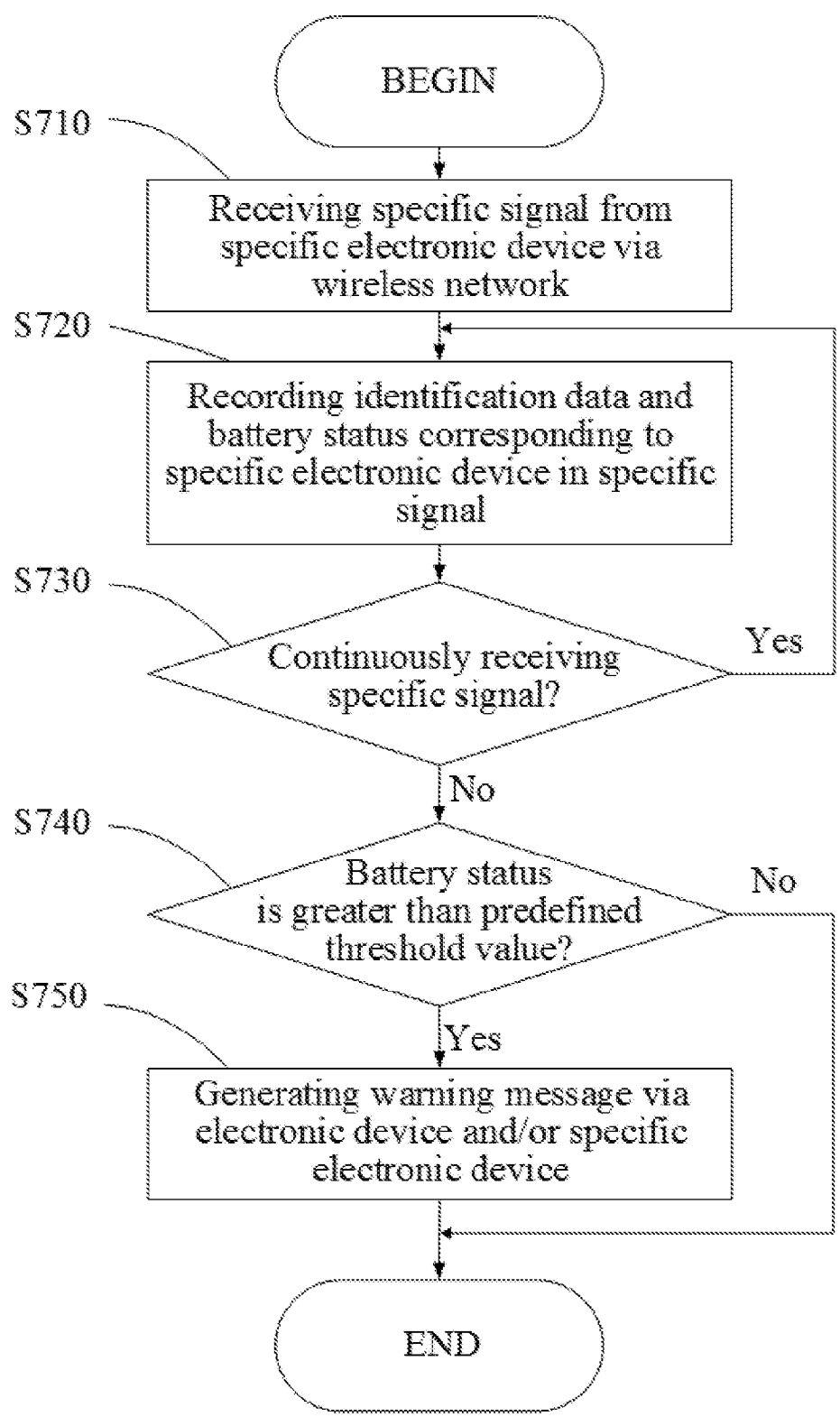
FIG. 7 is a flowchart of another embodiment of a method for detection management between electronic devices of the invention.

FIG. 7 is a flowchart of an embodiment of a method for detection management between electronic devices of the invention. The method for detection management between electronic devices can be used in an electronic device, such as a computer, or a portable device, such as a mobile phone, a smart phone, a PDA, a GPS, a tablet computer, or other portable device.

In step S710, a specific signal is received from a specific electronic device via a wireless network, such as Wi-Fi or Bluetooth network. The specific signal comprises identification data and a battery status corresponding to the specific electronic device. Similarly, in some embodiments, the specific electronic device can periodically obtain the newest battery status of the specific electronic device, and broadcast the specific signal with the identification data and the newest battery status corresponding to the specific electronic device in a predefined frequency. In step S720, the identification data and the battery status corresponding to the specific electronic device in the specific signal are recorded. In step S730, it is determined whether the specific signal is continuously received from the specific electronic device via the wireless network. As described, in some embodiments, it is determined whether a signal strength of the specific signal corresponding to the specific electronic device is greater than a predefined value. When the signal strength of the specific signal corresponding to the specific electronic device is not greater than the predefined value, it is determined that the specific signal is not received. When the specific signal is continuously received from the specific electronic device via the wireless network (Yes in step S730), the procedure returns to step S720. When the specific signal is not continuously received from the specific electronic device via the wireless network (No in step S730), in step S740, it is determined whether the recorded battery status is greater than a predefined threshold value. When the recorded battery status is not greater than the predefined threshold value (No in step S740), the procedure is completed. It is understood that, in some embodiments, when the recorded battery status is not greater than the predefined threshold value (No in step S740), a prompt message can be generated, in which the prompt message indicates that the specific electronic device needs to be charged. When the recorded battery status is greater than the predefined threshold value (Yes in step S740), in step S750, a warning message is generated via the electronic device and/or the specific electronic device, wherein the warning message indicates that the specific electronic device may be removed from the original preset place, or the specific electronic device may be lost. It is noted that, it is determined that the specific signal is not received when the signal strength of the specific signal is lower than the predefined value. At this time, the electronic device still can connect to the specific electronic device via a wireless network, and instruct the specific electronic device to generate the warning message.

Figure 8:
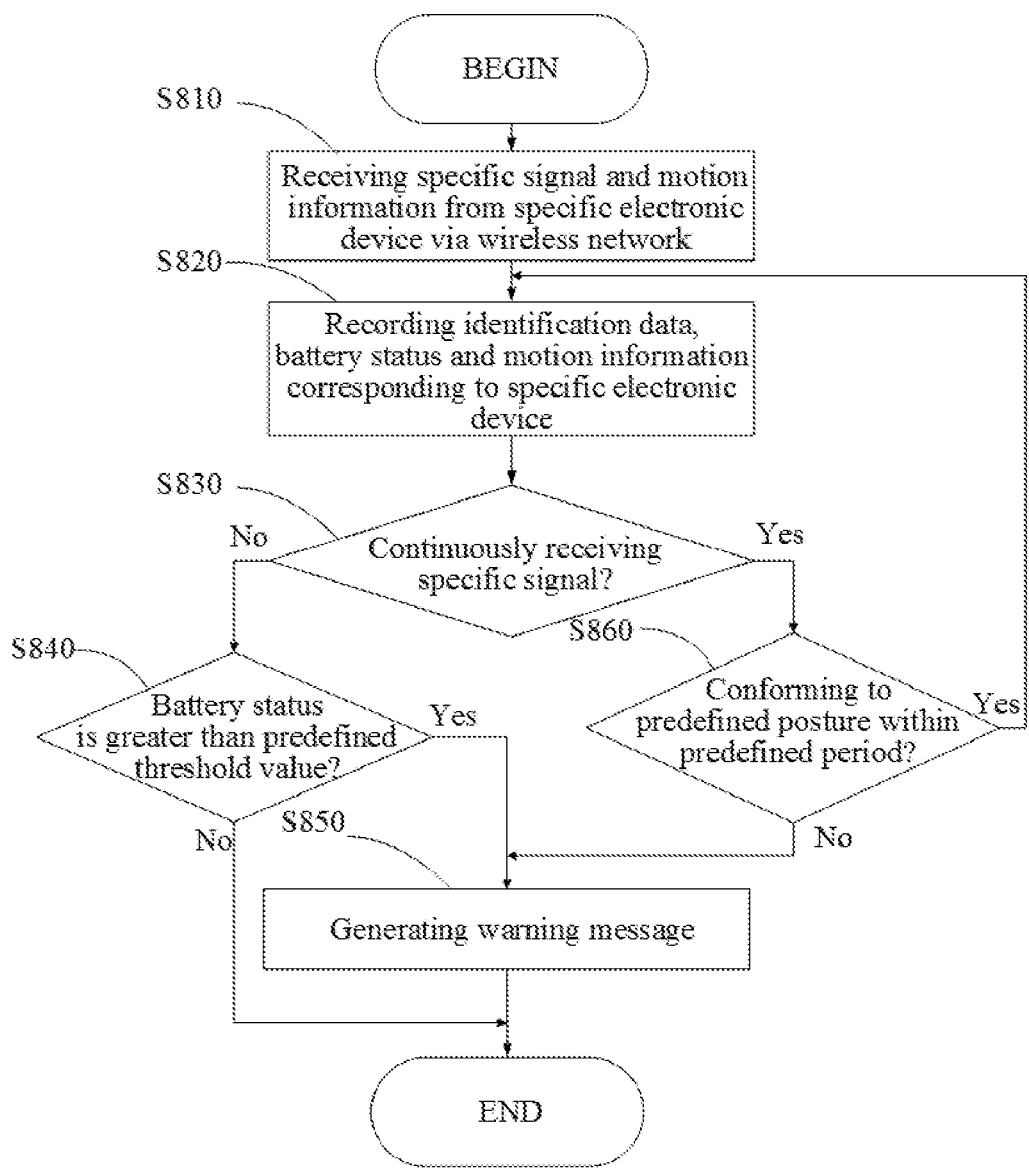
FIG. 8 is a flowchart of another embodiment of a method for detection management between electronic devices of the invention.

FIG. 8 is a flowchart of an embodiment of a method for detection management between electronic devices of the invention. The method for detection management between electronic devices can be used in an electronic device, such as a computer, or a portable device, such as a mobile phone, a smart phone, a PDA, a GPS, a tablet computer, or other portable device.

In step S810, a specific signal and motion information corresponding to a specific electronic device is received from the specific electronic device via a wireless network, such as Wi-Fi or Bluetooth network. The specific signal comprises identification data and a battery status corresponding to the specific electronic device. Additionally, the specific electronic device may comprise at least one sensor for detecting a motion and/or posture corresponding to the specific electronic device, and accordingly generating motion information. It is understood that, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the motion and/or posture of an electronic device can be applied in the present invention. Similarly, in some embodiments, the specific electronic device can periodically obtain the newest battery status and the motion information of the specific electronic device, and broadcast the specific signal with the identification data, the newest battery status, and the motion information corresponding to the specific electronic device in a predefined frequency. In step S820, the identification data, the battery status, and the motion information corresponding to the specific electronic device in the specific signal are recorded. In step S830, it is determined whether the specific signal is continuously received from the specific electronic device via the wireless network. As described, in some embodiments, it is determined whether a signal strength of the specific signal corresponding to the specific electronic device is greater than a predefined value. When the signal strength of the specific signal corresponding to the specific electronic device is not greater than the predefined value, it is determined that the specific signal is not received. When the specific signal is not continuously received from the specific electronic device via the wireless network (No in step S830), in step S840, it is determined whether the recorded battery status is greater than a predefined threshold value. When the recorded battery status is not greater than the predefined threshold value (No in step S840), the procedure is completed. Similarly, in some embodiments, when the recorded battery status is not greater than the predefined threshold value (No in step S840), a prompt message can be generated, in which the prompt message indicates that the specific electronic device needs to be charged. When the recorded battery status is greater than the predefined threshold value (Yes in step S840), in step S850, a warning message is generated via the electronic device and/or the specific electronic device, wherein the warning message indicates that the specific electronic device may be removed from the original preset place, or the specific electronic device may be lost. When the specific signal is continuously received from the specific electronic device via the wireless network (Yes in step S830), in step S860, it is determined whether the posture corresponding to the specific electronic device conforms or substantially conforms to at least one predefined posture within a predefined period according to the motion information. When the posture corresponding to the specific electronic device does not conform or substantially conform to the at least one predefined posture within the predefined period (No in step S860), in step S850, a warning message is generated via the electronic device and/or the specific electronic device, wherein the warning message indicates that the specific electronic device may be removed from the original preset place, or the specific electronic device may be lost. When the posture corresponding to the specific electronic device conforms or substantially conforms to the at least one predefined posture within the predefined period (Yes in step S860), the procedure returns to step S820.

Figure 9:
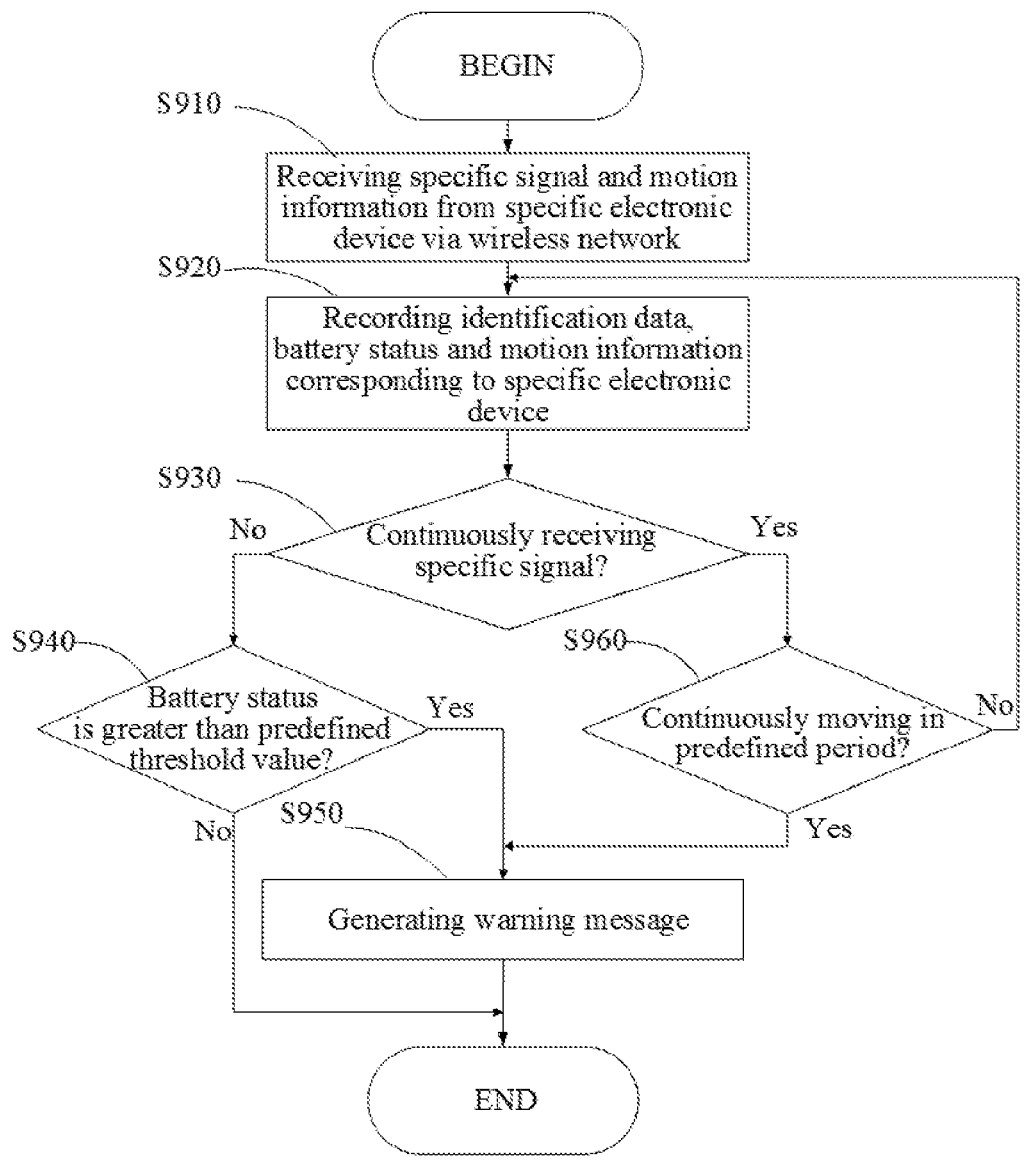
FIG. 9 is a flowchart of another embodiment of a method for detection management between electronic devices of the invention.

FIG. 9 is a flowchart of an embodiment of a method for detection management between electronic devices of the invention. The method for detection management between electronic devices can be used in an electronic device, such as a computer, or a portable device, such as a mobile phone, a smart phone, a PDA, a GPS, a tablet computer, or other portable device.

In step S910, a specific signal and motion information corresponding to a specific electronic device is received from the specific electronic device via a wireless network, such as Wi-Fi or Bluetooth network. The specific signal comprises identification data and a battery status corresponding to the specific electronic device. Additionally, the specific electronic device may comprise at least one sensor for detecting a motion and/or posture corresponding to the specific electronic device, and accordingly generating motion information. Similarly, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the motion and/or posture of an electronic device can be applied in the present invention. Similarly, in some embodiments, the specific electronic device can periodically obtain the newest battery status and the motion information of the specific electronic device, and broadcast the specific signal with the identification data, the newest battery status, and the motion information corresponding to the specific electronic device in a predefined frequency. In step S920, the identification data, the battery status, and the motion information corresponding to the specific electronic device in the specific signal are recorded. In step S930, it is determined whether the specific signal is continuously received from the specific electronic device via the wireless network. As described, in some embodiments, it is determined whether a signal strength of the specific signal corresponding to the specific electronic device is greater than a predefined value. When the signal strength of the specific signal corresponding to the specific electronic device is not greater than the predefined value, it is determined that the specific signal is not received. When the specific signal is not continuously received from the specific electronic device via the wireless network (No in step S930), in step S940, it is determined whether the recorded battery status is greater than a predefined threshold value. When the recorded battery status is not greater than the predefined threshold value (No in step S940), the procedure is completed. Similarly, in some embodiments, when the recorded battery status is not greater than the predefined threshold value (No in step S940), a prompt message can be generated, in which the prompt message indicates that the specific electronic device needs to be charged. When the recorded battery status is greater than the predefined threshold value (Yes in step S940), in step S950, a warning message is generated via the electronic device and/or the specific electronic device, wherein the warning message indicates that the specific electronic device may be removed from the original preset place, or the specific electronic device may be lost. When the specific signal is continuously received from the specific electronic device via the wireless network (Yes in step S930), in step S960, it is determined whether the specific electronic device continuously moves in a predefined period according to the motion information. When the specific electronic device continuously moves in the predefined period (Yes in step S960), in step S950, a warning message is generated via the electronic device and/or the specific electronic device, wherein the warning message indicates that the specific electronic device may be removed from the original preset place, or the specific electronic device may be lost. When the specific electronic device does not continuously move in the predefined period (No in step S960), the procedure returns to step S920.

Figure 10:
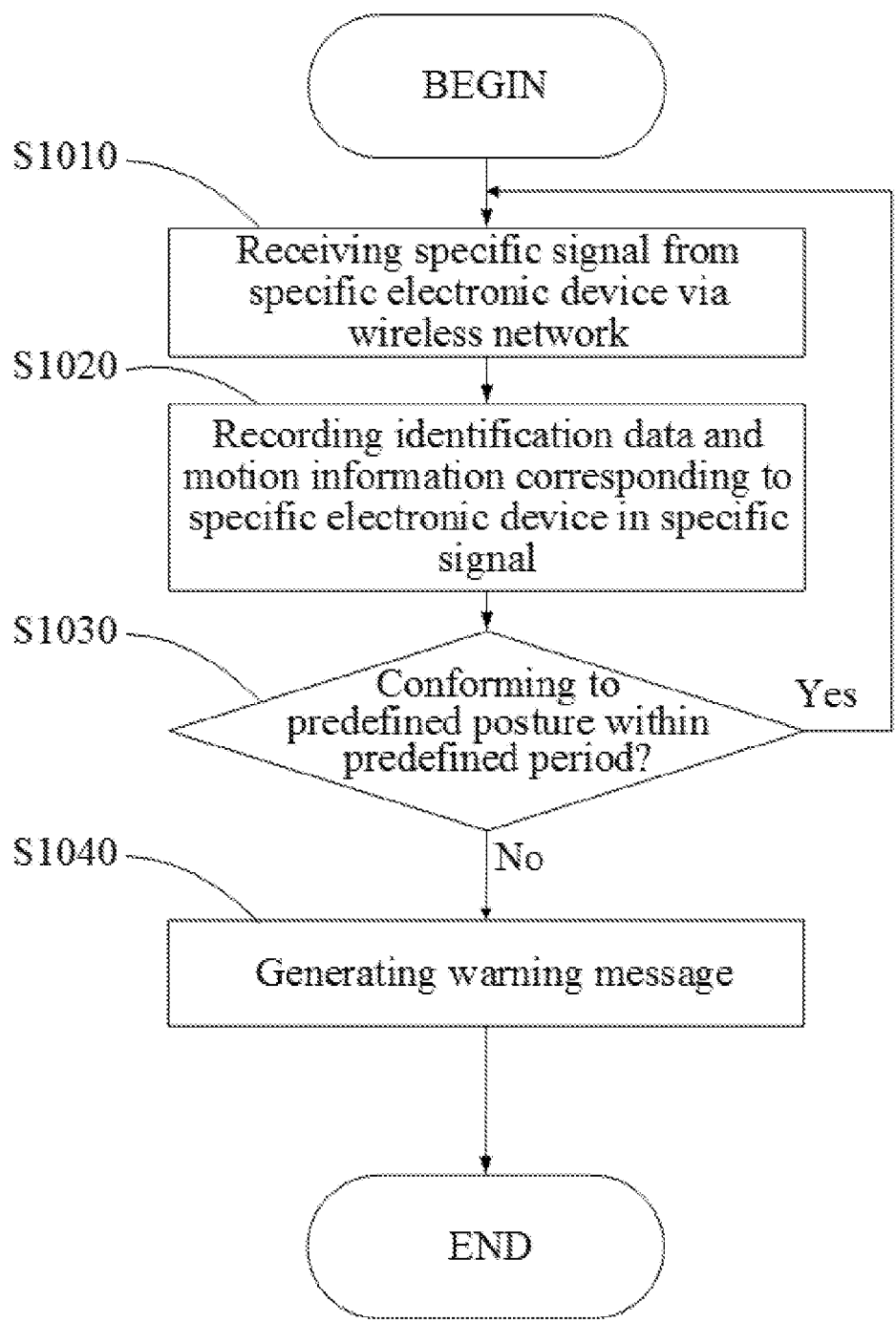
FIG. 10 is a flowchart of another embodiment of a method for detection management between electronic devices of the invention.

FIG. 10 is a flowchart of an embodiment of a method for detection management between electronic devices of the invention. The method for detection management between electronic devices can be used in an electronic device, such as a computer, or a portable device, such as a mobile phone, a smart phone, a PDA, a GPS, a tablet computer, or other portable device.

In step S1010, a specific signal is received from a specific electronic device via a wireless network, such as Wi-Fi or Bluetooth network. The specific signal comprises identification data and motion information corresponding to the specific electronic device. It is noted that, the specific electronic device may comprise at least one sensor for detecting a motion and/or posture corresponding to the specific electronic device, and accordingly generating motion information. Similarly, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the motion and/or posture of an electronic device can be applied in the present invention. Similarly, in some embodiments, the specific electronic device can periodically obtain the motion information of the specific electronic device, and broadcast the specific signal with the identification data and the motion information corresponding to the specific electronic device in a predefined frequency. In step S1020, the identification data and the motion information corresponding to the specific electronic device in the specific signal are recorded. In step S1030, it is determined whether the posture corresponding to the specific electronic device conforms or substantially conforms to at least one predefined posture within a predefined period according to the motion information. When the posture corresponding to the specific electronic device does not conform or substantially conform to the at least one predefined posture within the predefined period (No in step S1030), in step S1040, a warning message is generated via the electronic device and/or the specific electronic device, wherein the warning message indicates that the specific electronic device may be removed from the original preset place, or the specific electronic device may be lost. When the posture corresponding to the specific electronic device conforms or substantially conforms to the at least one predefined posture within the predefined period (Yes in step S1030), the procedure returns to step S1010.

Figure 11:
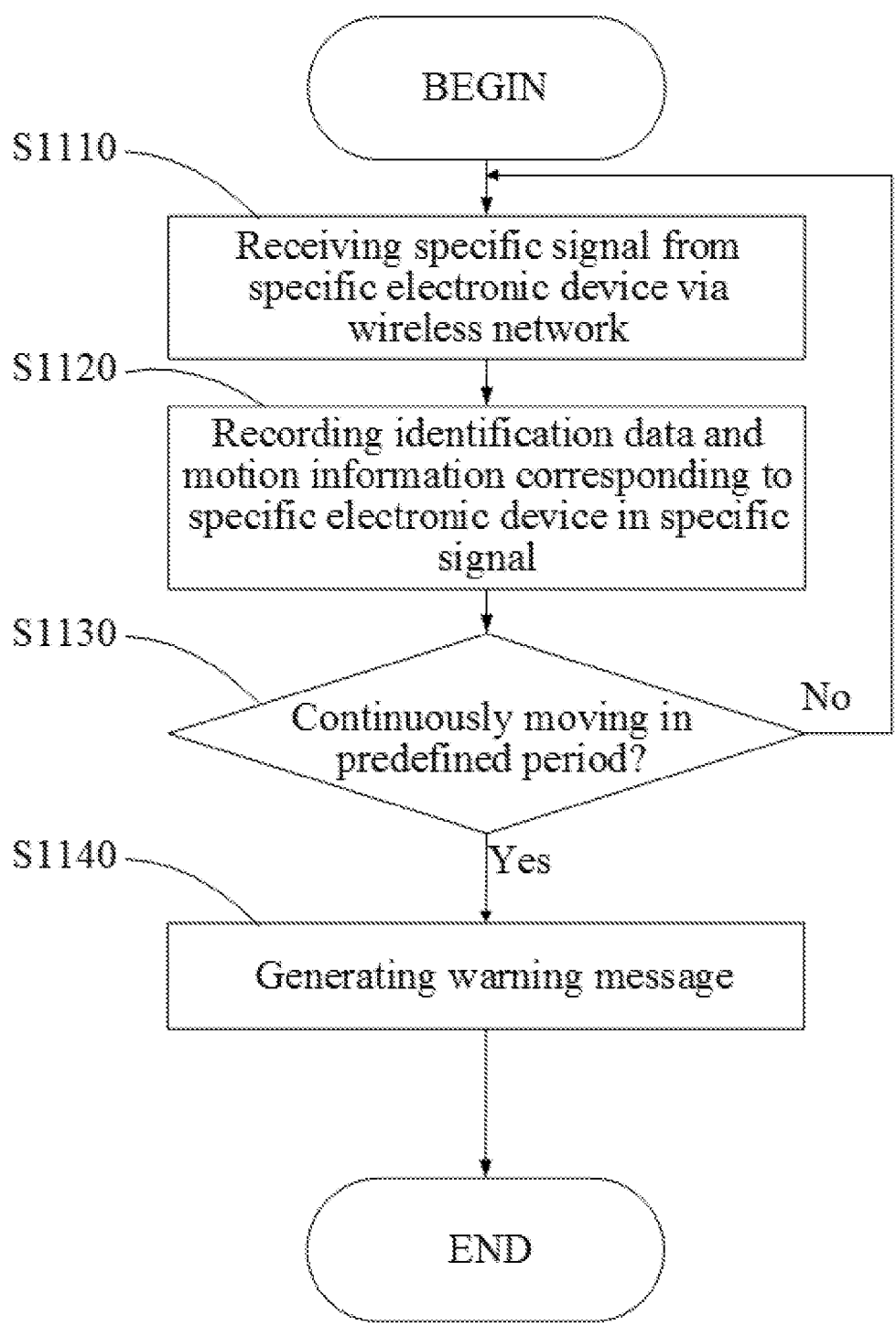
FIG. 11 is a flowchart of another embodiment of a method for detection management between electronic devices of the invention.

FIG. 11 is a flowchart of an embodiment of a method for detection management between electronic devices of the invention. The method for detection management between electronic devices can be used in an electronic device, such as a computer, or a portable device, such as a mobile phone, a smart phone, a PDA, a GPS, a tablet computer, or other portable device.

In step S1110, a specific signal is received from a specific electronic device via a wireless network, such as Wi-Fi or Bluetooth network. The specific signal comprises identification data and motion information corresponding to the specific electronic device. It is noted that, the specific electronic device may comprise at least one sensor for detecting a motion and/or posture corresponding to the specific electronic device, and accordingly generating motion information. Similarly, in some embodiments, the sensor may be an accelerometer for generating information of velocity and displacement when the device moves. In some embodiments, the sensor may be a Gyro sensor for generating information of angular acceleration when the device moves. It is noted that, the above sensors are only examples of the present application, and the present invention is not limited thereto. Any sensor that can detect the motion and/or posture of an electronic device can be applied in the present invention. Similarly, in some embodiments, the specific electronic device can periodically obtain the motion information of the specific electronic device, and broadcast the specific signal with the identification data and the motion information corresponding to the specific electronic device in a predefined frequency. In step S1120, the identification data and the motion information corresponding to the specific electronic device in the specific signal are recorded. In step S1130, it is determined whether the specific electronic device continuously moves in a predefined period according to the motion information. When the specific electronic device continuously moves in the predefined period (Yes in step S1130), in step S1140, a warning message is generated via the electronic device and/or the specific electronic device, wherein the warning message indicates that the specific electronic device may be removed from the original preset place, or the specific electronic device may be lost. When the specific electronic device does not continuously move in the predefined period (No in step S1130), the procedure returns to step S1110.

Therefore, the methods and systems for detection management between electronic devices of the present invention can manage the detection situation between electronic devices, and timely generate warning notifications according to the detection situation, thereby reducing the risk of losing devices, and reducing related cost and management complexity.

Methods for detection management between electronic devices may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for detection management between electronic devices for use in an electronic device, comprising:
   receiving a specific signal from a specific electronic device via a wireless network, wherein the specific signal comprises identification data and a battery status corresponding to the specific electronic device;
   recording the identification data and the battery status corresponding to the specific electronic device;
   determining whether the specific signal is no longer being received from the specific electronic device via the wireless network;
   determining whether the recorded battery status is greater than a predefined threshold value when the specific signal is no longer being received from the specific electronic device via the wireless network;
   generating a warning message when the specific signal is no longer being received and the recorded battery status is greater than the predefined threshold value;
   determining whether a signal strength of the specific signal corresponding to the specific electronic device is greater than a predefined value; and
   determining that the specific signal is not received when the signal strength of the specific signal corresponding to the specific electronic device is not greater than the predefined value.

2. The method of claim 1, wherein the specific electronic device transmits the specific signal on a predefined frequency, wherein the specific signal comprises the identification data corresponding to the specific electronic device, and the newest battery status corresponding to the specific electronic device.

3. The method of claim 1, further comprising generating a warning message via the specific electronic device when the specific signal is not received, and the battery status corresponding to the specific electronic device is greater than the predefined threshold value.

4. The method of claim 1, further comprising:
   receiving motion information from the specific electronic device via the wireless network, wherein the specific electronic device comprises at least one sensor for detecting a motion or posture corresponding to the specific electronic device, and accordingly generating the motion information;
   determining whether the posture corresponding to the specific electronic device conforms to at least one predefined posture within a predefined period according to the motion information when the specific signal is received from the specific electronic device; and
   generating the warning message when the posture corresponding to the specific electronic device does not conform to the at least one predefined posture within the predefined period.

5. The method of claim 1, further comprising:
   receiving motion information from the specific electronic device via the wireless network, wherein the specific electronic device comprises at least one sensor for detecting a motion or posture corresponding to the specific electronic device, and accordingly generating the motion information;
   determining whether the specific electronic device continuously moves in a predefined period according to the motion information when the specific signal is received from the specific electronic device; and
   generating the warning message when the specific electronic device continuously moves in the predefined period.

6. A system for detection management between electronic devices for use in an electronic device, comprising:
   a wireless connecting unit receiving a specific signal from a specific electronic device via a wireless network, wherein the specific signal comprises identification data and a battery status corresponding to the specific electronic device; and
   a processing unit recording the identification data and the battery status corresponding to the specific electronic device, determining whether the specific signal is no longer being received from the specific electronic device via the wireless network, determining whether the recorded battery status is greater than a predefined threshold value when the specific signal is no longer being received from the specific electronic device via the wireless network, generating a warning message when the specific signal is no longer being received and the recorded battery status is greater than the predefined threshold value, determining whether a signal strength of the specific signal corresponding to the specific electronic device is greater than a predefined value, and determining that the specific signal is not received when the signal strength of the specific signal corresponding to the specific electronic device is not greater than the predefined value.

7. A non-transitory machine-readable storage medium comprising a computer program, which, when executed, causes a device to perform a method for detection management between electronic devices, wherein the method comprises:

receiving a specific signal from a specific electronic device via a wireless network, wherein the specific signal comprises identification data and a battery status corresponding to the specific electronic device;

recording the identification data and the battery status corresponding to the specific electronic device;

determining whether the specific signal is no longer being received from the specific electronic device via the wireless network;

determining whether the recorded battery status is greater than a predefined threshold value when the specific signal is no longer being received from the specific electronic device via the wireless network;

generating a warning message when the specific signal is no longer being received and the recorded battery status is greater than the predefined threshold value;

determining whether a signal strength of the specific signal corresponding to the specific electronic device is greater than a predefined value; and determining that the specific signal is not received when the signal strength of the specific signal corresponding to the specific electronic device is not greater than the predefined value.

\* \* \* \* \*